May 15, 1962 M. L. ABEL 3,034,838
BEARING
Original Filed Feb. 27, 1959 2 Sheets-Sheet 1
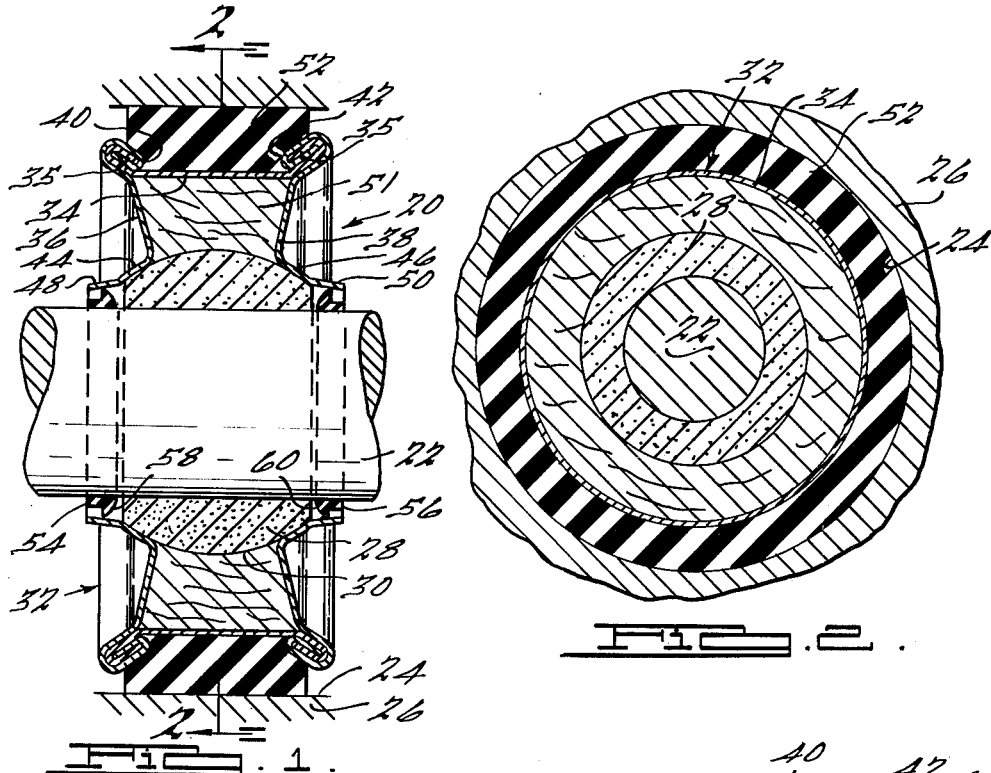
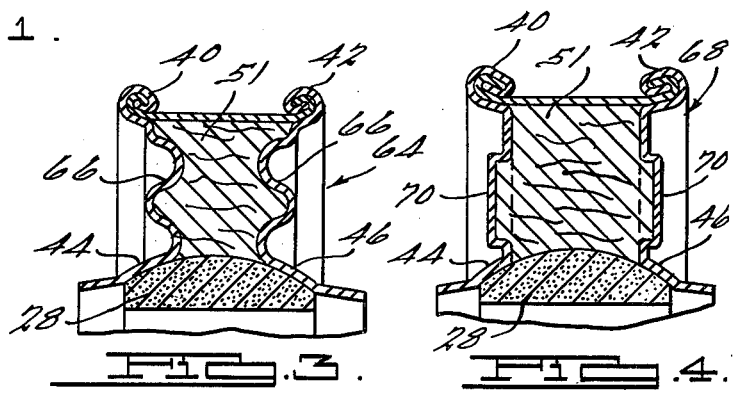
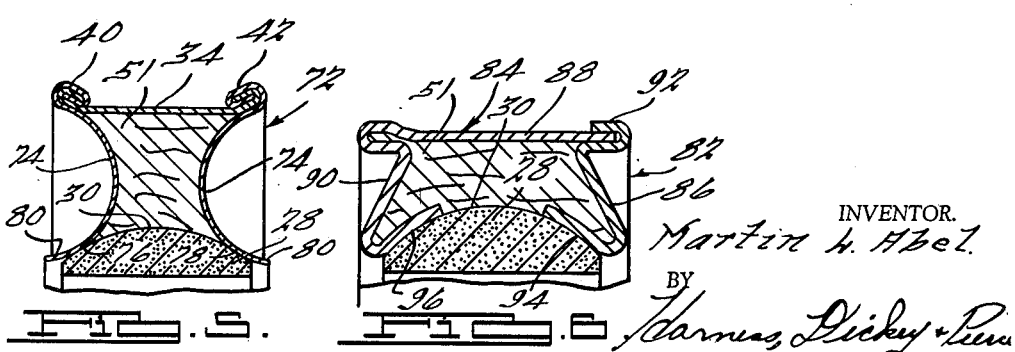
INVENTOR.
Martin L. Abel
BY
Barnes, Dickey & Pierce
ATTORNEYS.

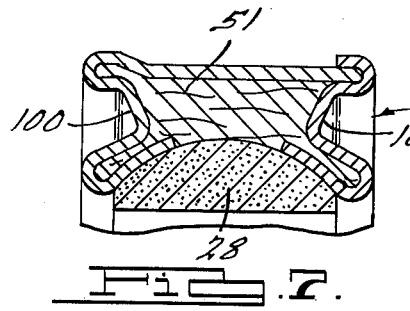
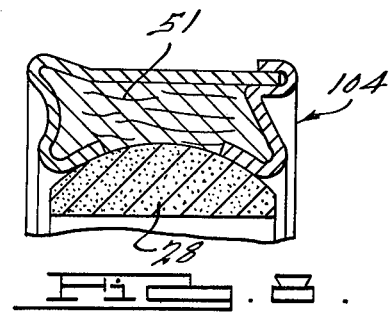
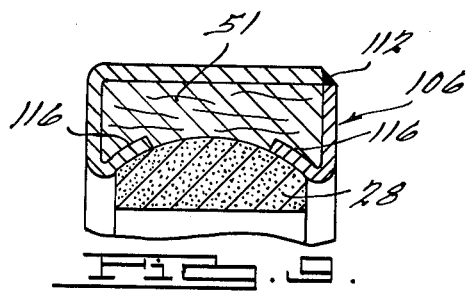
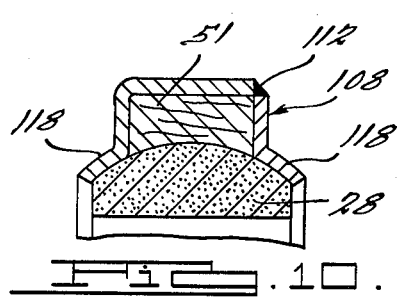
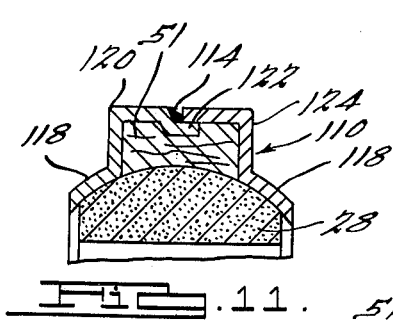
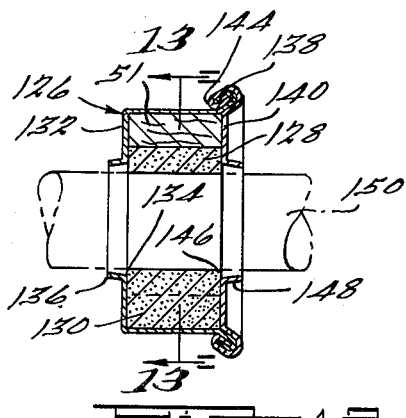
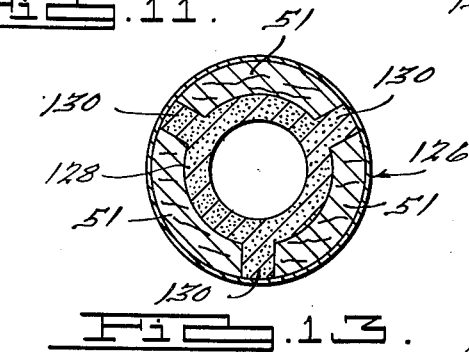

United States Patent Office 3,034,838
Patented May 15, 1962

3,034,838
BEARING
Martin L. Abel, Oak Park, Mich., assignor to Tann Corporation, Detroit, Mich., a corporation of Michigan
Continuation of application Ser. No. 796,027, Feb. 27, 1959. This application May 10, 1961, Ser. No. 112,154
10 Claims. (Cl. 308—72)

This invention relates to bearings and particularly to a bearing for mounting a shaft for rotation in a manner to also permit limited universal movement of the shaft. The present application is a continuation of my copending application Serial No. 796,027, filed on February 27, 1959, now abandoned.

Bearings for mounting a shaft for rotation and limited universal movement have been manufactured which comprise a porous bushing of bronze or the like having a truncated spherical shell thereabout which, together with the bushing, defines a closed annular space. A lubricated wicking material of the type disclosed in Patent No. 2,966,459, issued to me on December 27, 1960, and assigned to the assignee of the present invention, is disposed within the annular chamber to provide a reservoir of lubricating material which can pass through the porous bushing to the inner surface thereof for lubricating the surface of the shaft to be supported in the bushing.

A die cast or stamped housing having a mounting flange thereon is positioned about the truncated spherical shell for universally mounting the shell. With this construction, a shaft can be inserted within the bushing and the housing fixed to a frame or body so that the shaft can rotate within the bushing and also move universally relative to the frame or body since the truncated spherical member is mounted for universal movement in the die cast housing.

It is one object of the present invention to provide a bearing of the type described which is rugged and effective in use but far more economical to manufacture.

It is another object of the invention to provide a bearing for mounting a shaft for rotation and limited universal movement which is merely comprised of a bushing and stamped housing.

It is a further object of the invention to provide a bearing for mounting a shaft for rotation and limited universal movement which is comprised of a porous bushing universally mounted within a housing that is inexpensively fabricated from metal stampings or the like much in the same manner that conventional tin cans are fabricated.

Other objects and features of novelty of the invention will be specifically pointed out or will otherwise become apparent when referring, for a better understanding of the invention, to the following description taken in conjunction with the accompanying drawings, wherein:

FIG. 1 is a sectional view of a bearing embodying features of the invention;

FIG. 2 is a sectional view of a structure illustrated in FIG. 1, taken along the line 2—2 thereof;

FIG. 3 is a fragmentary sectional view of the structure illustrated in FIG. 1 illustrating a modification of the invention;

FIG. 4 is a fragmentary sectional view similar to that of FIG. 3 illustrating another modification of the invention;

FIG. 5 is a fragmentary sectional view similar to that of FIG. 3 illustrating a further modification of the invention;

FIG. 6 is a fragmentary sectional view similar to FIG. 3 illustrating a still further modification of the invention;

FIG. 7 is a fragmentary sectional view similar to that of FIG. 3 illustrating a still further modification of the invention;

FIG. 8 is a fragmentary sectional view similar to that of FIG. 3 illustrating a still further modification of the invention;

FIG. 9 is a fragmentary sectional view similar to that of FIG. 3 illustrating a still further modification of the invention;

FIG. 10 is a fragmentary sectional view similar to that of FIG. 3 illustrating a still further modification of the invention;

FIG. 11 is a fragmentary sectional view similar to that of FIG. 3 illustrating a still further modification of the invention;

FIG. 12 is a sectional view of a bearing embodying other features of the invention; and FIG. 13 is a sectional view of the structure illustrated in FIG. 12, taken along the line 13—13 thereof.

Referring to FIG. 1, a bearing 20 embodying features of the present invention is illustrated for rotatably and universally supporting a shaft 22 within an aperture 24 of a frame or body 26. The bearing 20 is comprised of a porous bushing 28 of bronze or a like bearing material, having a truncated spherical outer surface 30.

The bushing 28 is universally mounted within a housing 32 which is fabricated from a plurality of metal stampings or the like in a manner similar to the manner in which tin cans are fabricated. The housing 32 is comprised of a cylindrical element 34 having reversely bent flange portions 35 on the opposite peripheries thereof, and two spaced washer-shaped elements 36 and 38. It will be observed that the radially outer periphery of each of the washer-shaped elements 36 and 38 are rolled to form hook-shaped portions 40 and 42 which fit tightly over and engage the reversely bent flange portions 35 on each end of the cylindrical element 34 of the housing 32. The reversely bent flange portions 35 and hook-shaped portions 40 and 42 may be formed and interlocked automatically in the same manner that the tops and bottoms are formed and interlocked with the body of a tin can. Consequently, it is readily apparent that the housing 32 lends itself to manufacture at an extremely high production rate with a resulting relatively low cost per housing. The radially inner peripheries of the washer-shaped elements 36 and 38 are formed with outwardly projecting truncated spherical portions 44 and 46, respectively, which conform to and engage the truncated spherical surface of the bushing 28 adjacent opposite ends thereof, and terminates in tapered annular flange portions 48 and 50, respectively.

In manufacturing, it is apparent that the bushing 28 can be positioned between the washer-shaped elements 36 and 38 before they are affixed to the peripheries of the cylindrical element 34 and that the truncated spherical portions 44 and 46 as well as the flange portions 48 and 50 can be formed simultaneously with the hook-shaped portions 40 and 42 to universally mount the bushing 28 within the housing 32. The housing 32 may then be affixed within the aperture 24 of the frame or body 26 by suitable means such as a rubber ring 52, for example, which may be positioned about the cylindrical element 34 and press fit within the aperture 24. With this construction, the rubber ring 52 also serves as a resilient mounting for the shaft 22 to absorb shock and vibration. Further, since the shaft 22 is slidably disposed within the bushing 28, there will be substantially no axial forces tending to dislodge the rubber ring from the aperture 24.

To complete the assembly, suitable oil slingers 54 and 56 made of rubber or the like may be disposed over the shaft and within the annular flange portions 48 and 50 projecting outwardly from each side of the bushing 28 to prevent lubricating fluid from escaping out of the housing 32. It is apparent that any lubricant that may seep between the bushing 28 and the truncated spherical portions 44 and 46 will drop onto the beveled portions 58 and 60 of the oil slingers which will then throw the oil against the inner surface of the annular flange portions 48 and 50 by centrifugal force since the oil slingers rotate with the shaft 22. Of course, any oil on the annular flange portions 48 and 50 will naturally flow downwardly to the bottom thereof and thence back into the lubricated wicking material 51 adjacent the bottom of the bearing 20 due to gravity and the taper of the flange portions. With this construction, it is noted that it is not necessary for the oil slingers 54 and 56 to make contact with the flanges 48 and 50 to prevent oil from leaking out the ends of the housing 32 and thus the oil slingers do not create any drag when they rotate relative to the housing.

Referring to FIG. 3, a housing 64 is illustrated which differs from the housing 32 in that the body of the washer-shaped elements intermediate the hook-shaped portions 40 and 42 and truncated spherical portions 44 and 46 have corrugations 66 formed therein to provide the housing 64 with additional strength and stiffness. In FIG. 4, a modified housing 68 is illustrated wherein the body of each of the washer-shaped elements has an annular axially projecting boss 70 formed thereon to reinforce and stiffen the body 68. In FIG. 5, a housing 72 is illustrated wherein the washer-shaped elements are provided with concave semicylindrical cross sections 74 which engage the surface 30 of the bushing 28 in a line contact as at 76 and 78 to universally support the bushing 28 therein, the concave cross sections 74 extending beyond the line of engagement with the bushing 28 to provide flange portions 80 which perform the same function as the flange portions 48 and 50 of FIG. 1.

Another housing 82 is illustrated in FIG. 6 which is made of two separate elements 84 and 86 rather than the three elements 34, 36 and 38 as in FIG. 1. The element 84 is formed to provide both a cylindrical body portion 88 and a washer-shaped portion 90, whereas the portion 86 forms the equivalent of the washer-shaped portion 90 and has a reversely bent flange portion 92 on the radially outer periphery thereof for securing it to the periphery of the cylindrical portion 88, the radially inner periphery of the portion 86 and the washer-shaped portion 90 having inwardly bent truncated spherical flange portions 94 and 96 formed thereon respectively which engage the truncated spherical surface 30 of the bushing 28 to universally mount the bushing within the housing 82.

FIG. 7 illustrates a housing 98 which is similar to the housing 82 of FIG. 6 with the exception that washer-shaped portions 100 and 102 extend downwardly and inwardly from the radially outer periphery of the housing 98 to provide a different springiness or resiliency with regard to the manner in which the housing 98 supports the bushing 28 and shaft 22 as compared with that of the housing 82. FIG. 8 discloses a housing 104 having a configuration which is somewhat of a compromise between those of the housings 82 and 98 to simplify and eliminate the abrupt changes in the configuration of the housings 82 and 98 in order to make the housing 104 easier to fabricate.

Referring to FIGS. 9–11, housings 106, 108 and 110 are illustrated which are each comprised of two separate elements welded together as at 112 in FIGS. 9 and 10 and 114 in FIG. 11. It will be observed that the housing 106 is provided with inwardly projecting truncated spherical flange portions 116 for universally supporting the bushing 28, whereas the housing 108 has outwardly projecting truncated spherical flange portions 118 for universally supporting the bushing 28. Consequently, the housing 106 provides a larger annular chamber which can hold more lubricated wicking material 51 than can be held or retained in the housing 108. It will be observed that the housing 110 of FIG. 11 has the outwardly projecting truncated spherical flange portions 118 and differs from the housing 108 of FIG. 10 in that the weld 114 is made at the middle of the housing rather than at one corner as at 112 in FIG. 10. It will also be observed that left-hand portion 120 of the housing 110 of FIG. 11 is provided with a downwardly displaced flange 122 which underlies the adjacent periphery of the right-hand portion 124 to facilitate the welding of the two portions 120 and 124 together.

Referring to FIGS. 12 and 13, another embodiment of the invention is illustrated wherein a housing 126 is provided for rigidly supporting a cylindrical bushing 128 therein having outwardly projecting axially extending flanges or ribs 130 thereon. The housing 126 is comprised of a cylindrical cup-shaped element 132 having a central aperture 134 in the bottom thereof coaxially aligned with the aperture in the bushing 128. A tapered annular flange portion 136 projects outwardly from the periphery of the aperture 134 to perform the same function as the flange portion 48 of FIG. 1. A reversely bent flange portion 138 is formed on the periphery of the cup-shaped element 132 and a cover plate 140 is secured over the open end thereof by a hook-shaped portion 144 on the periphery of the cover plate which engages the reversely bent flange portion 138 as previously described with regard to the engagement between the reversely bent flange portion 35 and the hook-shaped portions 40 and 42 of FIG. 1.

The cover plate 140 has a central aperture 146 therein coaxially aligned with the aperture in the bushing 128 and the central aperture 134 in the bottom of the cup-shaped element 132, and an outwardly projecting tapered annular flange portion 148 is formed thereon similar to the flange portion 136. The lubricated wicking material 51 is inserted within the housing 126 so as to fill the spaces between the flanges or ribs 130 to provide lubricant for the porous bushing 128. With this construction, a shaft 150, as illustrated in dotted and dash lines in FIG. 12, may be rotatably mounted within the bushing 128 and the housing 126 rigidly supported on a frame or body. If desired, the housing 126 and flanges or ribs 130 may be fixed against rotation relative to one another but as a practical matter when the wicking material 51 is packed within the housing, the bushing 128 will not rotate relative thereto since the only force tending to rotate it would be the friction of the rotating shaft within the bushing which manifestly is less than that between the bushing and wicking material and the housing 126, particularly since the housing is tightly pressed against the bushing and the ribs 130 during formation.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A bearing assembly comprising a shaft, a pervious bushing slidably mounted on the shaft, said bushing having a truncated spherical outer surface, an annular housing coaxially disposed about said bushing and slidably engaging said surface near each end of the bushing so as to cooperate with said surface to define an enclosed annular chamber adapted to hold a lubricating material, said housing comprising a plurality of stampings fastened together by interlocking portions on the adjacent peripheries thereof, an oil slinger mounted on said shaft for rotation therewith adjacent to each end of said bushing, and an annular flange projecting axially outwardly from each end of said housing and overlapping said oil slingers to catch oil thrown radially outwardly thereby.

2. A bearing for a shaft comprising a pervious bushing having a truncated spherical outer surface, an annular housing coaxially disposed about said bushing and slidably engaging said surface near each end of the bushing so as to cooperate with said surface to define an enclosed annular chamber adapted to hold a lubricating material therein, said housing comprising a cylindrical element having reversely bent flange portions on each end thereof, two washer-shaped elements each having a hook-shaped portion on the radially outer periphery thereof interlocked with one of said reversely bent flange portions and a truncated spherical portion on the radially inner periphery thereof, the truncated spherical portion of each washer-shaped element conforming to and slidably engaging the truncated spherical surface of said bushing near each end thereof.

3. A bearing for a shaft comprising a pervious bushing having a truncated spherical outer surface, an annular housing coaxial disposed about said bushing and slidably engaging said surface near each end of the bushing so as to cooperate with said bushing to define an enclosed annular chamber adapted to hold a lubricating material, said housing comprising a cylindrical element having reversely bent flange portions on each end thereof, and two washer-shaped elements, each washer-shaped element having a hook-shaped portion on the radially outer periphery thereof interlocked with one of said reversely bent flange portions, a corrugated body portion and a truncated spherical portion on the radially inner periphery thereof terminating in a tapered annular flange, the truncated spherical portion of each washer-shaped element conforming to and slidably engaging the truncated spherical surface of said bushing near each end thereof.

4. A bearing for a shaft comprising a pervious bushing having a truncated spherical outer surface, an annular housing coaxially disposed about said bushing and slidably engaging said surface near each end of the bushing so as to cooperate with said bushing to define an enclosed annular chamber adapted to hold a lubricating material, said housing comprising a cylindrical element having a reversely bent flange portion on each end thereof, and two washer-shaped elements, each washer-shaped element having a hook-shaped portion on the radially outer periphery thereof interlocked with one of said reversely bent flange portions, a body portion having an annular axially projecting boss thereon and a truncated spherical portion on the radially innermost periphery thereof terminating in a tapered annular flange, said truncated spherical portion conforming to and slidably engaging the truncated spherical surface of said bushing near each end thereof.

5. A bearing for a shaft comprising a pervious bushing having a truncated spherical outer surface, an annular housing coaxially disposed about said bushing and slidably engaging said surface near each end of the bushing so as to cooperate with said bushing to define an enclosed annular chamber adapted to hold a lubricating material, said housing comprising a cylindrical element having reversely bent flange portions on each end thereof, and two washer-shaped elements, each of said washer-shaped elements having a semicylindrical concave cross-section with a hook-shaped portion on the radially outer periphery thereof interlocked with one of said reversely bent flanges, the convex surface of each of said washer-shaped elements slidably engaging the truncated spherical surface of said bushing adjacent opposite ends thereof in substantially a line contact to universally mount the bushing within the housing.

6. The subject matter as claimed in claim 5 wherein the radially inner periphery of each of said washer-shaped portions projects outwardly beyond the end of the bushing adjacent thereto.

7. A bearing for a shaft comprising a pervious bushing having a truncated spherical outer surface, an annular housing coaxially disposed about said bushing and slidably engaging said surface near each end of the bushing so as to cooperate with said bushing to define an enclosed annular chamber adapted to hold a lubricating material, said housing comprising a first element having a cylindrical portion and a washer-shaped portion extending generally radially inwardly from one end of said cylindrical portion and terminating in a truncated spherical flange portion conforming to and slidably engaging the truncated spherical surface of said bushing adjacent one end thereof, a second element having a washer-shaped portion with a reversely bent flange portion on the radially outer periphery thereof interlocked with the radially outer end of said cylindrical portion and a truncated spherical flange portion on the radially inner periphery thereof conforming to and slidably engaging the truncated spherical surface of said bushing adjacent the other end thereof.

8. The subject matter as claimed in claim 7 wherein each of said washer-shaped portions extends generally radially inwardly and axially outwardly from said cylindrical portion, and said truncated spherical portions extend axially inwardly.

9. A bearing for a shaft comprising a pervious bushing having a truncated spherical outer surface, an annular housing coaxially disposed about said bushing and slidably engaging said surface adjacent to each end of the bushing so as to cooperate with said surface to define an enclosed annular chamber adapted to hold a lubricating material therein, said housing having a cylindrical wall with two washer-shaped walls at each end thereof, at least one of said washer-shaped walls constituting a separate element having the radially outer edge thereof mechanically interlocked with the adjacent edge of said cylindrical wall, said mechanical interlocking being provided by a reversely bent flange portion on one of said edges and a hook-shaped portion on the other of said edges interlocked with said reversely bent flange portion, the radially inner portions of each of said washer-shaped walls slidably engaging the truncated spherical surface of said bushing near each end thereof.

10. A bearing for a shaft comprising a pervious bushing having a truncated spherical outer surface, an annular housing coaxially disposed about said bushing and slidably engaging said surface near each end of the housing so as to cooperate with said surface to define an enclosed annular chamber adapted to hold a lubricating material therein, said housing comprising a cylindrical element and two separate washer-shaped elements adjacent to each end of the cylindrical element, the radial outer edge of said washer-shaped elements being mechanically interlocked with the end of the cylindrical element adjacent thereto, each of said washer-shaped elements having a truncated spherical portion on the radial inner edge thereof conforming to and slidably engaging the truncated spherical surface of said bushing near each end thereof, and a ring made of resilient material encircling said housing and having an outer diameter greater than the maximum outer diameter of the housing.

References Cited in the file of this patent

UNITED STATES PATENTS

| | | |
|---|---|---|
| 1,656,508 | Claus | Jan. 17, 1928 |
| 1,946,086 | Lyman | Feb. 6, 1934 |
| 2,138,659 | Kindig | Nov. 29, 1938 |
| 2,230,472 | Sullivan | Feb. 4, 1941 |
| 2,233,104 | Martinet | Feb. 25, 1941 |
| 2,270,392 | Talmage | Jan. 20, 1942 |
| 2,318,477 | Firth | May 4, 1943 |
| 2,365,552 | Hill | Dec. 19, 1944 |
| 2,669,491 | Haller | Feb. 16, 1954 |
| 2,722,464 | Galaba | Nov. 1, 1955 |
| 2,891,826 | Josephson | June 23, 1959 |

FOREIGN PATENTS

| | | |
|---|---|---|
| 140,807 | Great Britain | Apr. 28, 1949 |
| 469,237 | Italy | Feb. 20, 1952 |